US006761098B1

(12) United States Patent
Esping et al.

(10) Patent No.: US 6,761,098 B1
(45) Date of Patent: Jul. 13, 2004

(54) APPARATUS FOR EMPTYING REELS OF WEB MATERIAL FIELD

(75) Inventors: Thomas Esping, Falkenberg (SE); Jan Göransson, Getinge (SE); Kjell Johansson, Falkenberg (SE); Jan Karlsson, Falkenberg (SE); Göran Ljungek, Holm (SE); Ove Nilsson, Falkenberg (SE)

(73) Assignee: Core Link AB, Falkenberg (SE)

( * ) Notice: Subject to any disclaimer, the term of this patent is extended or adjusted under 35 U.S.C. 154(b) by 0 days.

(21) Appl. No.: 09/959,185

(22) PCT Filed: Apr. 14, 2000

(86) PCT No.: PCT/SE00/00711

§ 371 (c)(1),
(2), (4) Date: Oct. 19, 2001

(87) PCT Pub. No.: WO00/62981

PCT Pub. Date: Oct. 26, 2000

(30) Foreign Application Priority Data

Apr. 19, 1999 (SE) .............................................. 9901393

(51) Int. Cl.$^7$ ........................... B23D 19/00; B26D 1/18; B26D 5/08

(52) U.S. Cl. .......................... 83/102; 83/102.1; 83/105; 83/452; 83/487; 83/578; 83/614; 83/639.5; 83/923; 83/924

(58) Field of Search ................................ 83/578, 102.1, 83/614, 649, 452, 487, 636, 639.1, 639.5, 923, 939, 937, 99, 105, 102, 924

(56) References Cited

U.S. PATENT DOCUMENTS

| | | | | | |
|---|---|---|---|---|---|
| 40,034 | A | * | 9/1863 | Hardy | 83/488 |
| 601,964 | A | * | 4/1898 | Hood | 83/649 |
| 1,555,391 | A | * | 9/1925 | Surfus | 83/614 |
| 1,838,011 | A | * | 12/1931 | St. Peter | 83/614 |
| 3,100,414 | A | * | 8/1963 | Watkins et al. | 83/924 |
| 3,213,735 | A | * | 10/1965 | Keferstein et al. | 83/614 |
| 3,245,302 | A | * | 4/1966 | Bayley | 83/614 |
| 3,277,761 | A | * | 10/1966 | Dreher | 83/614 |
| 3,656,519 | A | * | 4/1972 | Stackhouse | 83/102.1 |
| 3,762,259 | A | * | 10/1973 | Kuts | 83/488 |
| 3,779,121 | A | * | 12/1973 | Lagain | 83/614 |
| 4,099,435 | A | * | 7/1978 | Young | 83/649 |
| 4,313,356 | A | * | 2/1982 | Artz | 83/923 |
| 4,476,761 | A | * | 10/1984 | Bird | 83/614 |
| 4,506,575 | A | * | 3/1985 | McCay et al. | 83/614 |
| 4,597,820 | A | * | 7/1986 | Nozaka | 83/371 |
| 4,628,894 | A | * | 12/1986 | Stewart | 83/102.1 |
| 4,674,473 | A | * | 6/1987 | Stewart | 83/574 |
| 4,779,498 | A | * | 10/1988 | Perkins | 83/924 |
| 4,821,971 | A | * | 4/1989 | Watanabe et al. | 83/649 |
| 4,864,906 | A | * | 9/1989 | Hall | 83/487 |
| 5,001,955 | A | * | 3/1991 | Fujiwara | 83/614 |
| 5,072,638 | A | * | 12/1991 | Huser | 83/99 |
| 5,199,841 | A | * | 4/1993 | Von Gehlen | 83/909 |
| 5,243,890 | A | * | 9/1993 | Ober | 83/102.1 |
| 5,312,058 | A | * | 5/1994 | Brandt et al. | 83/614 |
| 5,377,569 | A | * | 1/1995 | Richards et al. | 83/98 |
| 5,386,751 | A | * | 2/1995 | Dylla et al. | 83/649 |
| 5,467,676 | A | * | 11/1995 | Hooper et al. | 83/614 |
| 5,715,605 | A | * | 2/1998 | Nadeau | 83/924 |
| 5,759,350 | A | * | 6/1998 | Pyron et al. | 83/614 |
| 5,915,370 | A | * | 6/1999 | Casper | 83/578 |
| 5,964,024 | A | * | 10/1999 | Wallace | 83/924 |
| 6,327,948 | B1 | * | 12/2001 | Tuori | 83/177 |

* cited by examiner

*Primary Examiner*—Allan N. Shoap
*Assistant Examiner*—Jason Prone
(74) *Attorney, Agent, or Firm*—McGinn & Gibb, PLLC

(57) ABSTRACT

An apparatus for emptying a reel on which a web of material is wound in layers. A frame supports the reel. A carriage is mounted on the frame for reciprocal movement longitudinally in a first direction and in a second direction opposite the first direction over the reel. A knife is mounted on the carriage for movement with the carriage to cut sheets of material from the web as the carriage moves over the reel. A plough removes cut sheets of the material from the reel as the carriage moves over the reel.

10 Claims, 4 Drawing Sheets

APPARATUS FOR EMPTYING REELS OF WEB MATERIAL FIELD

FIELD

The present invention relates to an apparatus for emptying reels of web material.

BACKGROUND

In the manufacture of web-shaped material on reels, it is relatively often necessary to reject a number of reels and to take care of returned reels which are damaged in one way or another and which will not be accepted by customers. Such broken reels are to be emptied of the web-shaped material on the reels. The material is to be recycled by, for example, being comminuted and dissolved into pulp in order later to become new paper. The core of the reel, in the form of a sleeve, is to be taken care of and re-used. The reason for this is that it is not desirable to comminute and dissolve the sleeve material, since this should not be included in the pulp. Prior art reel dividers or guillotines have proved to suffer from drawbacks in the form of, among other things, complex design and construction, lack of versatility, and above all high costs, as well as the fact that they often damage the sleeve (the core) so that this cannot be re-used.

The task forming the basis of the present invention is to provide a novel apparatus overcoming these problems.

SUMMARY

The present invention provides an apparatus which is relatively simple from the design and construction point of view, and which has proved to be extremely efficient and versatile. The apparatus according to the present invention is extremely simple to adapt to different types of material, e.g. fine paper, paperboard, tissue, plastic, and foils of types such as aluminum foil. The relatively simple design and construction moreover guarantee a high dependability and simple maintenance.

BRIEF DESCRIPTION OF THE DRAWINGS

The present invention will now be described in greater detail hereinbelow, with reference to the accompanying drawings. In the drawings.

DETAILED DESCRIPTION

Figure 1:
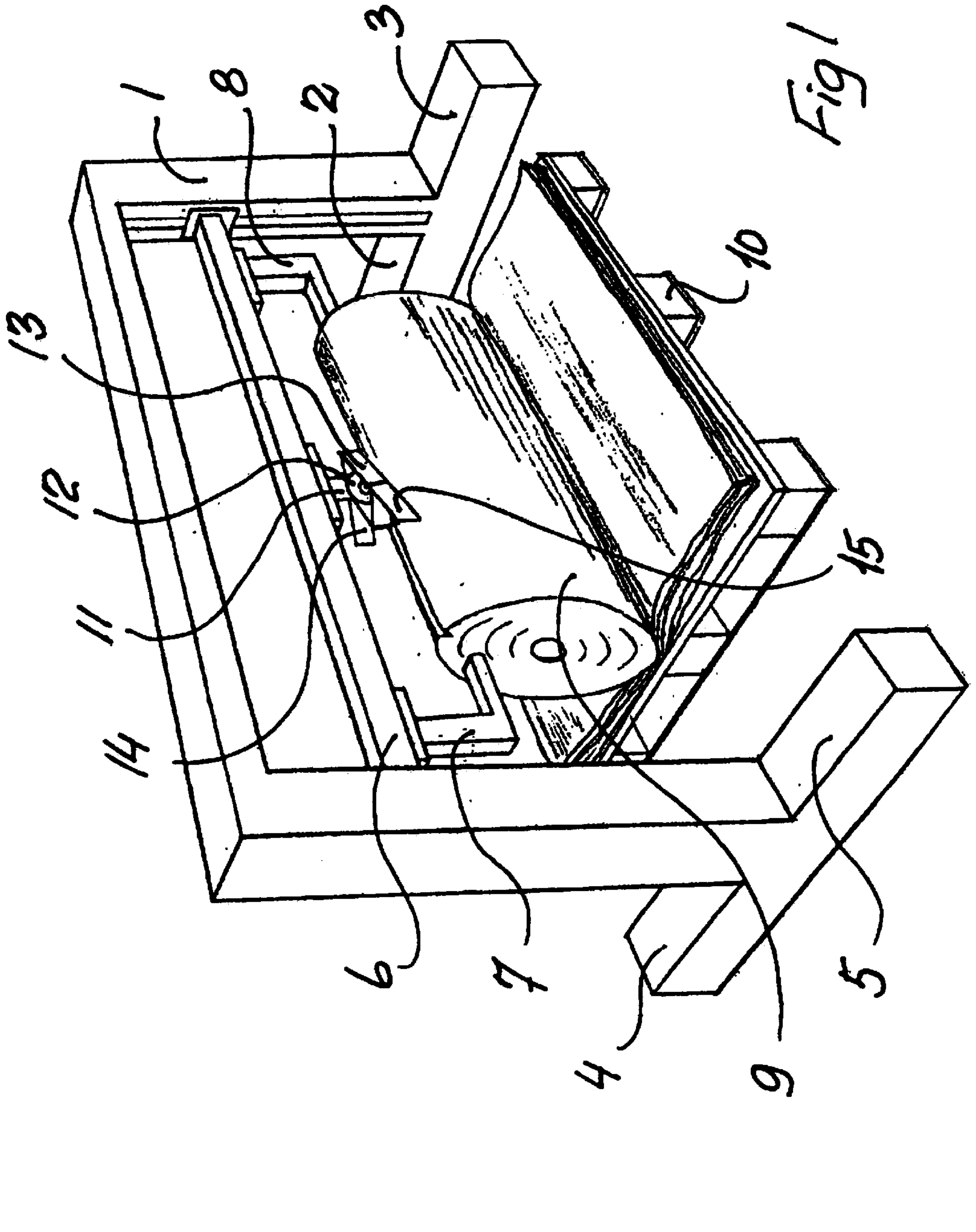
FIG. 1 is a schematic, perspective view of one embodiment of an apparatus according to the present invention.

The embodiment of an apparatus according to the present invention schematically illustrated in FIG. 1 has a frame 1 in the form of an inverted U with feet 2, 3, 4 and 5. Between the vertical shanks in the frame 1, a beam or boom 6 extends which is displaceable up and down in the frame 1. The beam or boom 6 carries side supports 7 and 8 which are displaceable in the longitudinal direction of the boom or beam 6 for adapting to each end of a paper reel 9 which is placed in the frame 1 and may rest on a per se conventional pallet 10. After placing of the side supports 7 and 8 against the ends of the paper reel 9, it is appropriate to lock the side supports 7 and 8 in the desired position.

A shuttle-like carriage 11 is displaceable reciprocally on the boom or beam 6 between the side supports 7 and 8. The carriage 11 supports a roller knife 12 and a plough 13 with two flaps 14 and 15. The plough 13 is double-directed and the flaps 14 and 15 are adjustable for adaptation to the direction of movement of the plough 13 and the carriage 11.

In FIG. 1 the parts are shown with the roller knife 12 during cutting work on movement from left to right on the reel 9. The layers or sheets cut through during the preceding stroke have already fallen down onto the pallet 10. The boom or beam 6 is fed progressively down towards the center of the reel 9. This downward movement ceases when the sleeve in the reel 9 is reached, whereafter the pallet 10 with the severed sheets is conveyed off for recycling. The sleeve is taken care of for possible re-use. The beam or boom 6 is returned to its starting position, whereafter a new damaged reel may be placed in the frame 1. The beam or boom 6 is displaceable by means of screws of the like disposed in the frame legs.

Figure 2:
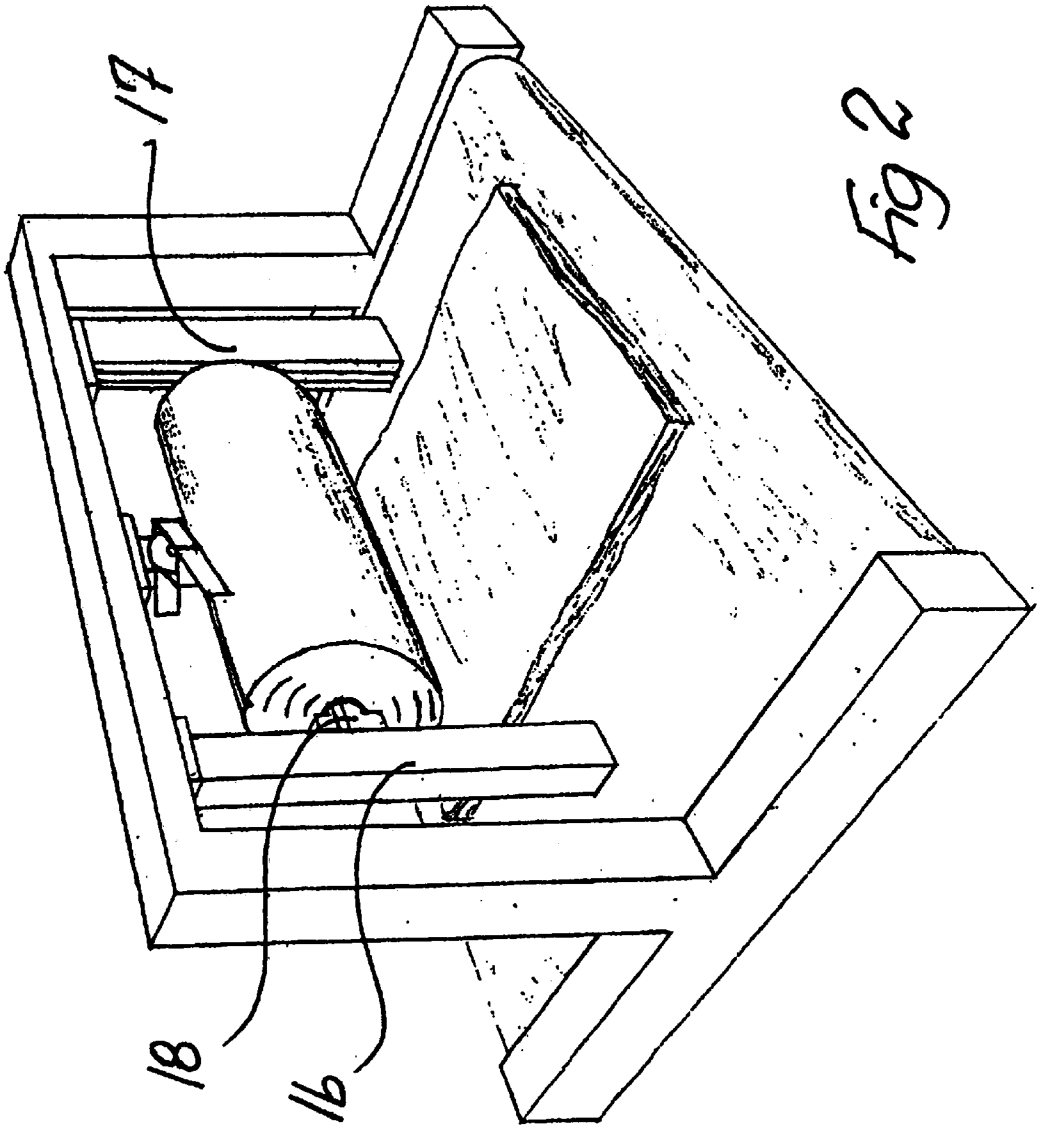
FIG. 2 is a view, similar to that of FIG. 1, of another embodiment of an apparatus according to the present invention.

In the embodiment of the present invention illustrated in FIG. 2, the frame 1 is disposed on a leg 16 on one side of the reel 9 and a leg 17 on the other side of the reel 9. In the legs 16 and 17, there are provided pins 18 for engagement in the sleeve of the reel 9 to lift the reel up towards the shuttle carriage 11 with the roller knife 12 and the plough 13. In this embodiment, the severed sheets are deposited below the reel 9 and may be transported off in any suitable manner. Possibly, a conveyer may be provided for continuous removal of the sheets.

Figure 3:
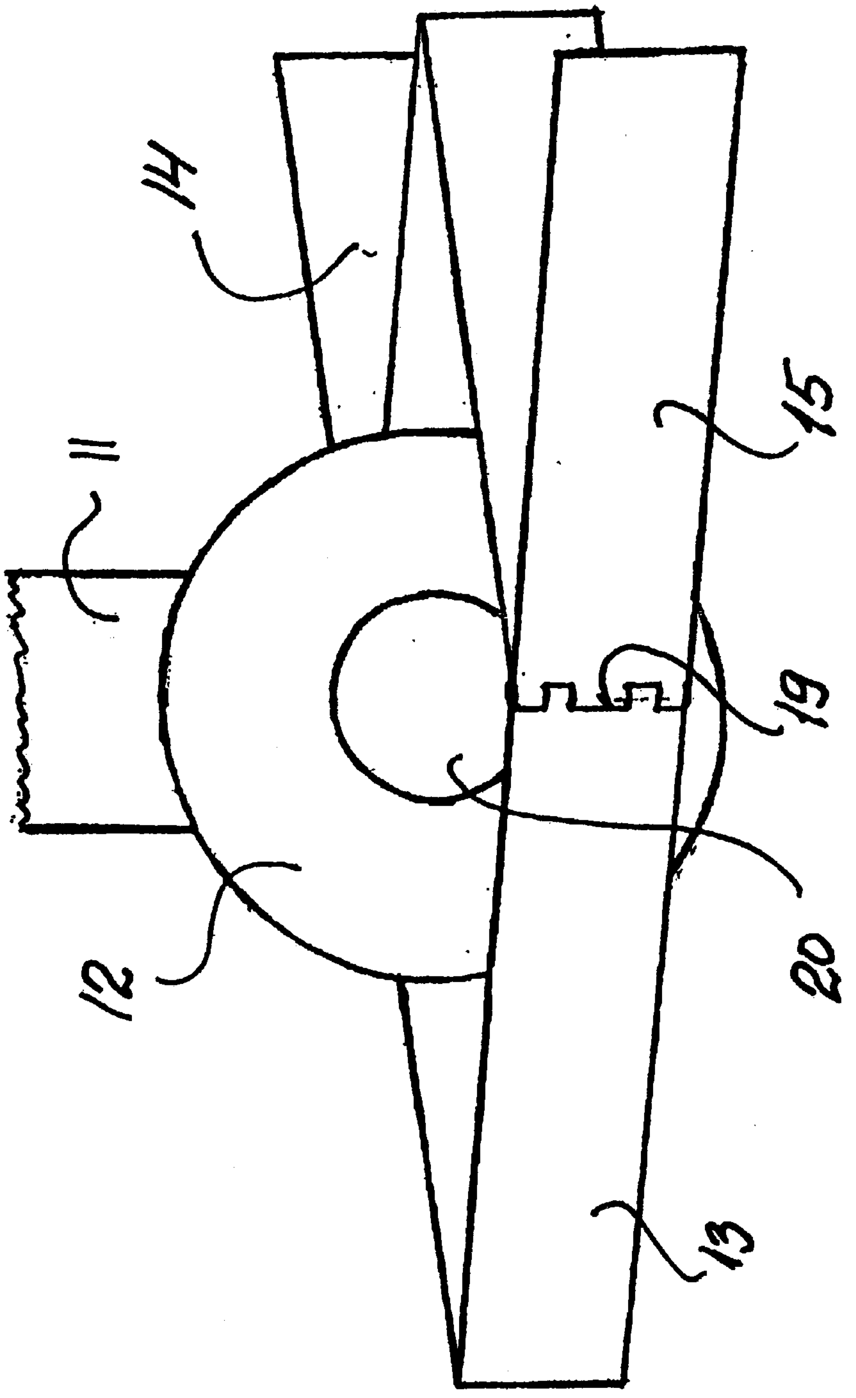
FIG. 3 is a schematic view of a shuttle carriage for an apparatus according to the present invention.

FIG. 3 shows the carriage 11 in greater detail with the knife 12, the plough 13 and the flaps 14 and 15. It has proved to be suitable that the knife 12 rotate when cutting such web-shaped material as fine paper and paperboard, while the knife 12 may suitably be stationary when cutting such material as, for example, tissue. The carriage 11 is suitably connected to a linear prime mover, for example a pneumatic cylinder, a so-called shuttle cylinder, for reciprocal displacement between the ends of the reel 9. Suitably, the roller knife 12 is freely running, but it may be either stationary or driven, depending upon the different material qualities. FIG. 3 illustrates more closely that the flaps 14 and 15 are secured on the plough 13 with the aid of hinges 19 centrally positioned on the plough 13 and permitting pivoting of the flaps 14 and 15 from the position illustrated in FIG. 3 to the position illustrated in FIGS. 1 and 2.

The roller knife 12 is mounted on a hub or shaft 20 at the end of a swing or end walls forming the shuttle carriage 11. The swing may be pivotal for angular positioning of the roller knife 12 and the plough 13 in relation to the longitudinal axis of the reel 9. The roller knife 12 may, as was mentioned above, be freely rotated, driven or locked, depending upon the material variety on the reel 9. The shuttle carriage 11 may be mounted on a shuttle piston in a shuttle cylinder. Such an arrangement is exemplified in FIG. 4 which is described in greater detail below. The plough 13 may be suspended by bolts which extend from a plate which is connected to the shuttle carriage 11 with the aid of a carrier or stub shaft. With the aid of the bolts, it is possible to adjust the plough in relation to the roller knife 12. The flaps 14 and 15 may be switchable with the aid of pistons which are suitably of the pneumatic type.

Figure 4:
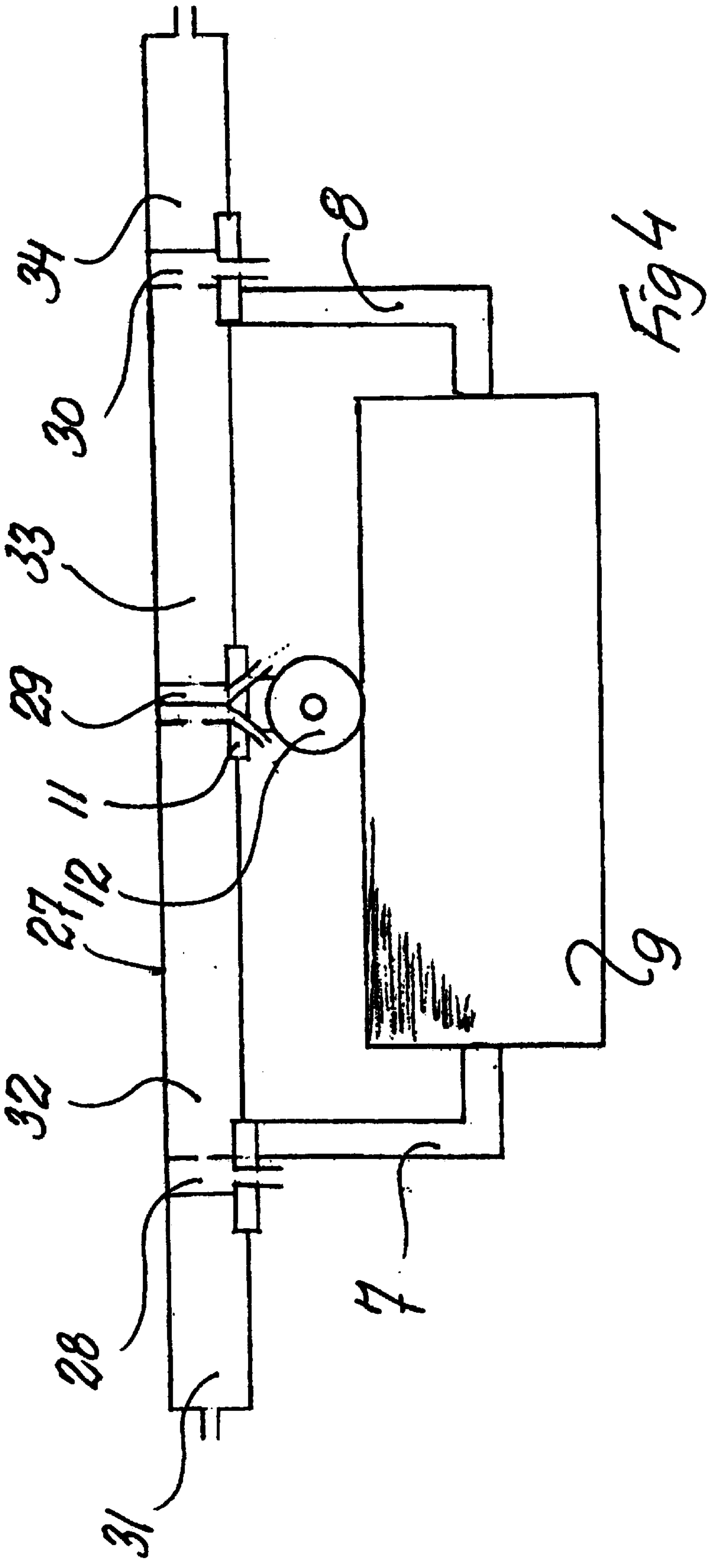
FIG. 4 is a schematic view of one embodiment of a part of an apparatus according to the present invention.

The arrangement exemplified in FIG. 4 displays a shuttle cylinder 27 with three pistons 28, 29 and 30. The piston 29 supports the shuttle 11 with the roller knife 12, while the side supports 7 and 8 are mounted on the pistons 28 and 30, respectively, the side supports 7 and 8 being urged against the ends of the reel 9. The pistons 28, 29 and 30 divide the shuttle cylinder 27 into four chambers 31, 32, 33 and 34. When the chambers 31 and 34 are pressurized, the side supports 7 and 8 are urged against the ends of the reel 9. A somewhat lower pressure in the chamber 32 will displace the piston 29 with the shuttle 11 and the roller knife 12 from the piston 28 towards the piston 30. When the roller knife 12 has reached or passed the end of the paper reel 9, the pressurization is switched from the chamber 32 to the chamber 33 and the flaps 14 and 15 are switched for displacement of the roller knife 12 towards the piston 28, and thereby the other end of the reel 9. As previously, the cylinder 27 is progressively displaced towards the reel 9 in suitable cutting depths, or the reel 9 is displaced upwards towards the cylinder 27.

When cutting such a material variety as tissue, it has proved to be suitable to maintain the roller knife 12 stationary and employ air jets as the plough instead of the mechanical plough 12 with the flaps 14 and 15 described in the foregoing.

Many modifications are naturally possible without departing from the scope of the inventive concept.

What is claimed is:

1. An apparatus for emptying a reel on which a web of material is wound in layers, the reel having a longitudinal axis, said apparatus comprising:

a frame for supporting the reel;

a carriage mounted on said frame for reciprocal movement longitudinally in a first direction and in a second direction opposite the first direction over the reel when the reel is supported on said frame;

a knife mounted on said carriage for movement with said carriage to cut layers of the web of material into sheets as said carriage moves both in the first direction and in the second direction over the reel when the reel is supported on said frame; and a plough, separate from said knife, for removing cut sheets of the material from the reel and causing the cut sheets of the material to fall from the reel as said carriage moves in the first direction and as said carriage moves in the second direction over the reel when the reel is supported on said frame.

2. An apparatus as claimed in claim 1, further comprising:

a pneumatic cylinder;

a piston dividing said pneumatic cylinder into first and second chambers; and means for controlling pressure within said first and second chambers to move said piston; and wherein said carriage is mounted on said piston for movement therewith, to move said knife over the reel when the reel is supported on said frame.

3. An apparatus as claimed in claim 1, wherein said knife is a roller knife.

4. An apparatus as claimed in claim 1, wherein said knife extends closer to the material than does the plough when the reel is supported on said frame.

5. An apparatus as claimed in claim 1, wherein said plough includes a pair of flaps which broaden said plough.

6. An apparatus as claimed in claim 1, wherein said plough is mounted on said carriage.

7. An apparatus as claimed in claim 1, wherein said plough has a first end, for removing the cut sheets of the material as said carriage moves in the first direction over the reel, and a second end, for removing the cut sheets of the material as said carriage moves in the second direction over the reel.

8. An apparatus as claimed in claim 7, wherein said plough includes a pair of hinged flaps movable between a first position, in which said flaps broaden said plough as said plough moves in the first direction, and a second position, in which said flaps broaden said plough as said plough moves in the second direction.

9. An apparatus as claimed in claim 1, further comprising a beam on which said carriage is mounted, said beam being mounted on said frame for movement toward and away from the reel when the reel is supported on said frame so as to maintain said knife in contact with the web of material when the reel is supported on said frame.

10. An apparatus as claimed in claim 9, further comprising:

a pneumatic cylinder within said beam;

a piston dividing said pneumatic cylinder into first and second chambers; and means for controlling pressure within said first and second chambers to move said piston on said beam, and wherein said carriage is mounted on said piston for movement therewith, to move said knife over the reel when the reel is supported on said frame.

* * * * *